United States Patent
Sales et al.

(10) Patent No.: US 10,802,993 B2
(45) Date of Patent: Oct. 13, 2020

(54) DRIVERLESS DEVICE CONFIGURATION

(71) Applicant: SEAGATE TECHNOLOGY LLC, Cupertino, CA (US)

(72) Inventors: Alain Sales, Viry Chatillon (FR); Emmanuel Lemay, Houilles (FR); Sylvain Sevamy, Paris (FR); Stéphane Gosné, Bois-Colombes (FR)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 348 days.

(21) Appl. No.: 15/933,629

(22) Filed: Mar. 23, 2018

(65) Prior Publication Data

US 2019/0294561 A1 Sep. 26, 2019

(51) Int. Cl.
| | |
|---|---|
| G06F 13/10 | (2006.01) |
| G06F 8/654 | (2018.01) |
| G06F 11/07 | (2006.01) |
| G06F 13/40 | (2006.01) |
| G06F 3/06 | (2006.01) |
| G06F 13/16 | (2006.01) |

(52) U.S. Cl.
CPC .......... *G06F 13/102* (2013.01); *G06F 3/0604* (2013.01); *G06F 3/0653* (2013.01); *G06F 3/0673* (2013.01); *G06F 8/654* (2018.02); *G06F 11/0727* (2013.01); *G06F 11/0751* (2013.01); *G06F 11/0772* (2013.01); *G06F 13/1668* (2013.01); *G06F 13/4068* (2013.01)

(58) Field of Classification Search
CPC ...... G06F 13/102; G06F 8/654; G06F 3/0604; G06F 3/0653; G06F 3/0673; G06F 11/0727; G06F 13/1668
See application file for complete search history.

(56) References Cited

U.S. PATENT DOCUMENTS

| | | | |
|---|---|---|---|
| 7,743,390 B2 | 6/2010 | Cheng | |
| 7,793,014 B2* | 9/2010 | Paley | G06F 3/0622 710/36 |
| 9,535,581 B2 | 1/2017 | Hargreaves et al. | |
| 2004/0098596 A1* | 5/2004 | Elteto | G06F 21/34 713/185 |

(Continued)

FOREIGN PATENT DOCUMENTS

| | | | | |
|---|---|---|---|---|
| KR | 20020097113 A | * | 12/2002 | |
| WO | WO-2012014196 A1 | * | 2/2012 | ........... G06F 3/0607 |

OTHER PUBLICATIONS

Machine translation of KR2002-0097113 obtained from K-PION website <url: http://kposd.kipo.go.kr:8088/up/kpion/>. (Year: 2002).*

(Continued)

*Primary Examiner* — Glenn A. Auve
(74) *Attorney, Agent, or Firm* — Westman, Champlin & Koehler, P.A.

(57) ABSTRACT

Systems and methods for configuration of computer peripherals are described. In one embodiment, the systems and methods may include detecting the storage device being connected to a host machine; determining whether the host machine supports human interface device (HID) service; and upon determining the host machine supports the HID service, bypassing installation of a driver and using a HID protocol to establish an interface between the storage device and the host machine.

20 Claims, 7 Drawing Sheets

(56) References Cited

U.S. PATENT DOCUMENTS

| | | | |
|---|---|---|---|
| 2012/0331202 A1 | 12/2012 | Cohen et al. | |
| 2015/0186304 A1* | 7/2015 | Hulbert | G06F 13/102 |
| | | | 710/10 |
| 2017/0031842 A1* | 2/2017 | Hulbert | H04L 67/42 |
| 2017/0139849 A1* | 5/2017 | Bandic | G06F 13/4282 |
| 2019/0188376 A1* | 6/2019 | Marcu | G06F 12/1433 |

OTHER PUBLICATIONS

Kosolapov, Samuel; "Protocol for Driverless USB HID Reliable Data Transfer"; Materials, Methods & Technology vol. 10, 2016; pp. 550-557; accessed at Journal of International Scientific Publications <url: https://scientific-publications.net/en/article/1001177/> (Year: 2016).*

Human translation of KR 2002-0097113 A (Year: 2002).*

* cited by examiner

DRIVERLESS DEVICE CONFIGURATION

SUMMARY

The present disclosure is directed to methods and systems for configuration of computer peripherals. In some embodiments, the present systems and methods may configure computer peripherals and implement one or more features of the computer peripherals without the need of installing a device driver. The computer peripherals may include storage devices, input devices, and hardware controllers, although other types of devices may be included.

A storage system for configuration of computer peripherals is described. In one embodiment, the storage system may include a storage device and a hardware controller. In some embodiments, the hardware controller may be configured to detect the storage device being connected to a host machine; determine whether the host machine supports human interface device (HID) service; and upon determining the host machine supports the HID service, bypass installing a driver and use a HID protocol to establish an interface between the storage device and the host machine.

In some embodiments, the hardware controller may be configured to update firmware on the storage device using the HID protocol, monitor temperature on the storage device using the HID protocol, and configure encryption settings on the storage device using the HID protocol. In some cases, one or more fans of the storage device may be controlled using the HID protocol. Additionally or alternatively, the HID protocol may be used to display text and/or graphics on one or more screens of the storage device.

In some embodiments, the hardware controller may be configured to monitor one or more hardware components on the storage device using the HID protocol, use the HID protocol to retrieve at least one of a serial number of the storage device, a firmware version of the storage device, a status report of the storage device, or any combination thereof, and use the HID protocol to configure one or more Redundant Array of Independent Disks (RAID) settings on the storage device.

In some embodiments, the hardware controller may be configured to use the HID protocol to detect an error on storage device and to send an error message to the host machine indicating the detected error. In some cases, upon determining the host machine does not support the HID service, the hardware controller may be configured to install a driver to enable the one or more features of the storage device on the host machine. In some cases, the HID service may include a universal serial bus (USB) HID class. In some embodiments, the storage device may be connected to the host machine using at least one of a USB connection, a THUNDERBOLT® connection, a BLUETOOTH® connection, or any combination thereof.

A method for configuration of computer peripherals is also described. In one embodiment, the method may include detecting the storage device being connected to a host machine; determining whether the host machine supports human interface device (HID) service; and upon determining the host machine supports the HID service, bypassing installation of a driver and using a HID protocol to establish an interface between the storage device and the host machine.

A computer-program product to improve a computer system is also described. In one embodiment, the computer-program product may include a non-transitory computer-readable medium storing instructions thereon, the instructions being executable by one or more processors to perform the steps of detecting the storage device being connected to a host machine and determining whether the host machine supports human interface device (HID) service. In some cases, the HID service may include a universal serial bus (USB) HID class. Upon determining the host machine supports the HID service, the instructions may be executable by one or more processors to perform the steps of bypassing installation of a driver and using a HID protocol to establish an interface between the storage device and the host machine.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, including their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components, including those having a dash and a second reference label, apply to other similar components. If only the first reference label is used in the specification, the description is applicable to any one of the similar components having the same first reference label irrespective of the second reference label.

DETAILED DESCRIPTION

Figure 1:
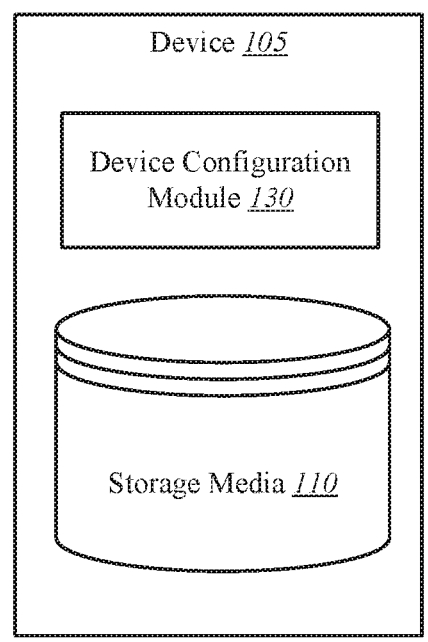
FIG. 1 is a block diagram of an example of a system in accordance with various embodiments.

The following relates generally to configuration of computer peripherals. In one embodiment, the present systems and methods solve the difficulty of communicating relatively easily between a computing device and a peripheral such as a feature rich direct attached mass storage peripheral. A conventional peripheral required a device driver be installed on the computing device to enable the computer to communicate with the peripheral and enable the features of the peripheral.

In one embodiment, the present systems and methods may configure a storage device to use a universal serial bus (USB) human interface device (HID) service to communicate with a feature-rich direct attached mass storage device without requiring installed of a dedicated driver. In one embodiment, the storage device may enumerate a USB HID interface. In some cases, the storage device may include a microcontroller configured to perform one or more operations described herein. In some cases, the microcontroller may be a customized microcontroller configured to perform the one or more operations. In some embodiments, the microcontroller may be a microcontroller dedicated to perform the one or more operations.

In one embodiment, a computing device to which the storage device attaches may recognize the enumerated HID interface. For example, an operating system of the computing device may recognize the interface class because it is part of a USB class. In one embodiment, the microcontroller, in conjunction with the enumeration, may create a bi-directional communication link between the storage device and the computing device. The bi-directional communication link may enable the storage device and/or computing device to send and/or receive data. In some cases, the microcontroller may be configured to bridge the communication link between the storage device and the computing device. In some cases, the microcontroller may process one or more messages communicated between the storage device and the computing device.

In one embodiment, communication link may be used to perform one or more operations. For example, the communication link may be used to configure features of the storage device such as configuring redundant array of independent disks (RAID) volumes and modes, configuring temperature alert thresholds, configuring alerts, configuring notifications (e.g., alert notifications, status notifications, etc.), or any combination thereof. In some cases, the storage drive may include one or more RAID chips. In some cases, the communication link may enable the computing device to configure one or more settings on at least one of the one or more RAID chips.

In some embodiments, the communication link may enable the computing device to update embedded firmware of the storage device, to monitor the hardware components of the storage device, monitor the software behavior of the storage device, or any combination thereof. In some embodiments, the communication link may enable the computing device to retrieve information from the storage device (serial number, firmware version, etc.).

In one embodiment, the communication link may enable the computing device to configure encryption settings of the storage device. For example, the communication link may allow a computing device to enable encryption on a self-encrypting drive (SED). Additionally or alternatively, the communication link may enable the computing device to perform at least one of unlock/lock the storage device, execute encryption commands, control one or more fans of the storage device, display text or graphics, or both, on one or more screens of the storage device, or any combination thereof.

In one embodiment, the communication link may enable the computing device to monitor one or more operating conditions of the storage device. For example, the communication link may enable the computing device to monitor at least one of temperature of the storage drive, number of read operations, number of write operations, read error rates, write error rates, seek error rates, seek times, power-on hours, or any combination thereof. In some cases, the communication link may enable the computing device to configure allocations of a storage medium of the storage device, configure allocations of a RAID volume, update a channel of the storage device, configure device management of the storage device, or any combination thereof.

In one embodiment, the present systems and methods may be enumerated through any physical link compatible with USB enumeration even if the mass storage is not mounted in USB. For example, the storage device may be enumerated through a THUNDERBOLT® connection, a BLUETOOTH® connection, in conjunction with a WiFi connection, etc., or any combination thereof.

In one embodiment, the microcontroller may use a USB HID class independently and alongside a storage feature of the storage device. In some cases, the communication link may include a HID-based link for configuration and monitoring of the storage device as well as a storage link for reading data from the storage device and/or writing data to the storage device. Accordingly, a mass storage feature of a connected storage device may be used on a host computing device without requiring any driver or any other type of software installation on the host.

FIG. 1 is a block diagram illustrating one embodiment of an environment 100 in which the present systems and methods may be implemented. The environment may include device 105 and storage media 110. The storage media 110 may include any combination of hard disk drives, solid state drives, and hybrid drives that include both hard disk and solid state drives. In some embodiments, the storage media 110 may include shingled magnetic recording (SMR) storage drives. In some embodiments, the systems and methods described herein may be performed on a single device such as device 105. In some cases, the methods described herein may be performed in conjunction with multiple storage devices or a network of storage devices such a cloud storage system and/or a distributed storage system. Examples of device 105 include a storage server, a storage enclosure, a storage controller, storage drives in a distributed storage system, storage drives on a cloud storage system, storage devices on personal computing devices, storage devices on a server, or any combination thereof. In some configurations, device 105 may include device configuration module 130. In one example, the device 105 may be coupled to storage media 110. In some embodiments, device 105 and storage media 110 may be components of flash memory or a solid state drive and/or another type of storage drive. Alternatively, device 105 may be a component of a host of the storage media 110 such as an operating system, host hardware system, or any combination thereof.

In one embodiment, device 105 may be a computing device with one or more processors, memory, and/or one or more storage devices. In some cases, device 105 may include a wireless storage device. In some embodiments, device 105 may include a cloud drive for a home or office setting. In one embodiment, device 105 may include a network device such as a switch, router, access point, or any combination thereof. In one example, device 105 may be operable to receive data streams, store and/or process data, and/or transmit data from, to, or in conjunction with one or more local and/or remote computing devices.

The device 105 may include a database. In some cases, the database may be internal to device 105. In some embodiments, storage media 110 may include a database. Additionally, or alternatively, device 105 may include a wired and/or a wireless connection to an external database. Additionally, as described in further detail herein, software and/or firmware (for example, stored in memory) may be executed on a processor of device 105. Such software and/or firmware executed on the processor may be operable to cause the device 105 to monitor, process, summarize, present, and/or send a signal associated with the operations described herein.

In some embodiments, storage media 110 may connect to device 105 via one or more networks. Examples of networks include cloud networks, local area networks (LAN), wide area networks (WAN), virtual private networks (VPN), a personal area network, near-field communication (NFC), a telecommunications network, wireless networks (using 802.11, for example), and cellular networks (using 3G and/or LTE, for example), or any combination thereof. In some configurations, the network may include the Internet and/or an intranet. The device 105 may receive and/or send signals over a network via a wireless communication link. In some embodiments, a user may access the functions of device 105 via a local computing device, remote computing device, and/or network device. For example, in some embodiments, device 105 may include an application that interfaces with a user. In some cases, device 105 may include an application that interfaces with one or more functions of a network device, remote computing device, and/or local computing device.

In one embodiment, the storage media 110 may be internal to device 105. As one example, device 105 may include a storage controller that interfaces with storage media of storage media 110. Device configuration module 130 may detect a storage device connecting to a host machine. In some embodiments, device configuration module 130 may establish a communication/configuration interface between the storage device and the host machine. In some cases, device configuration module 130 may establish the communication/configuration interface in accordance with one or more HID protocols.

Figure 2:
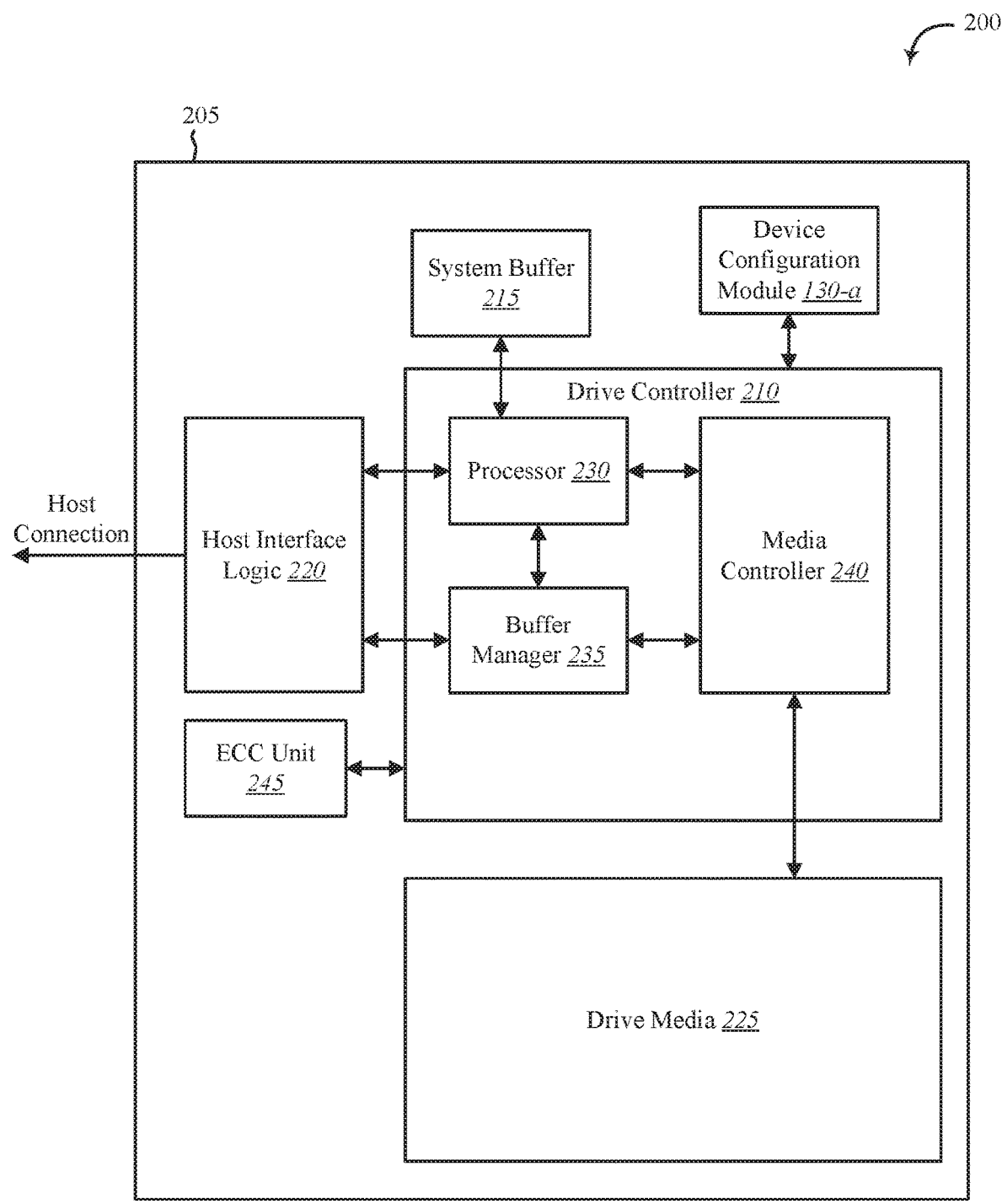
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, system buffer 215, host interface logic 220, drive media 225, and device configuration module 130-a. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used such as Structured/Platform ASICs, Field Programmable Gate Arrays (FPGAs), and other Semi-Custom ICs, which may be programmed in any manner known in the art. The functions of each module may also be implemented, in whole or in part, with instructions embodied in memory formatted to be executed by one or more general and/or application-specific processors.

In one embodiment, the drive controller 210 may include a processor 230, a buffer manager 235, and a media controller 240. The drive controller 210 may process, via processor 230, read and write requests in conjunction with the host interface logic 220, the interface between the apparatus 205 and the host of apparatus 205. The system buffer 215 may hold data temporarily for internal operations of apparatus 205. For example, a host may send data to apparatus 205 with a request to store the data on the drive media 225. Drive media 225 may include one or more disk platters, flash memory, any other form of non-volatile memory, or any combination thereof. The driver controller 210 may process the request and store the received data in the drive media 225. In some cases, a portion of data stored in the drive media 225 may be copied to the system buffer 215 and the processor 230 may process or modify this copy of data and/or perform an operation in relation to this copy of data held temporarily in the system buffer 215. In some cases, error correction control (ECC) unit 245 may perform error correction on data stored in drive media 225.

In some embodiments, device configuration module 130-a may include at least one of one or more processors, one or more memory devices, one or more storage devices, instructions executable by one or more processors stored in one or more memory devices and/or storage devices, or any combination thereof. Although depicted outside of drive controller 210, in some embodiments, device configuration module 130-a may include software, firmware, and/or hardware located within drive controller 210 and/or operated in conjunction with drive controller 210. For example, device configuration module 130-a may include at least a portion of processor 230, buffer manager 235, and/or media controller 240. In one example, device configuration module 130-a may include one or more instructions executed by processor 230, buffer manager 235, and/or media controller 240.

Figure 3:
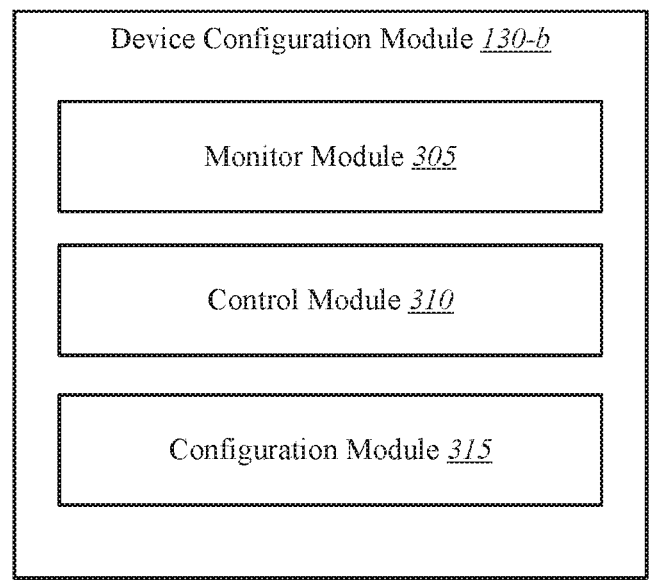
FIG. 3 shows a block diagram of one or more modules in accordance with various aspects of this disclosure.

FIG. 3 shows a block diagram of device configuration module 130-b. The device configuration module 130-b may include one or more processors, memory, and/or one or more storage devices. The device configuration module 130-b may include monitor module 305, control module 310, and configuration module 315. The device configuration module 130-b may be one example of device configuration module 130 of FIGS. 1 and/or 2. Each of these components may be in communication with each other.

In some embodiments, device configuration module 130 may include and/or operate in conjunction with one or more processors, microcontrollers, memory devices, storage devices, or any combination thereof. In some embodiments, device configuration module 130 may be configured to perform one or more operations on or in conjunction with a storage device and/or a host machine.

In one embodiment, monitor module 305 may be configured to monitor one or more aspects associated with a storage device and/or a host machine. In one example, monitor module 305 may be configured to detect a storage device being connected to a host machine.

In one embodiment, control module 310 may be configured to determine whether a host machine supports human interface device (HID) service. Upon determining the host machine supports the HID service, control module 310 may be configured to bypass installing a driver on the host machine. Upon determining the host machine does not support the HID service, configuration module 315 may be configured to install a driver to enable the one or more features of the storage device on the host machine.

In some cases, control module 310 may use a HID protocol to establish an interface between the storage device and the host machine. The established interface may include a communication interface between the storage device and the host machine. In some embodiments, the HID service may be a universal serial bus (USB) HID class. In some cases, the storage device may connect to the host machine using at least one of a USB connection, a THUNDERBOLT® connection, a BLUETOOTH® connection, or any combination thereof.

In some embodiments, control module 310 may be configured to use the established interface to enable communication between the storage device and the host machine. In some cases, the communication interface between the storage device and the host machine may be implemented based at least in part on the HID protocol.

In some embodiments, control module 310 may be configured to use the HID protocol to retrieve at least one of a serial number of the storage device, a firmware version of the storage device, a status report of the storage device, or any combination thereof. For example, control module 310 may send queries, requests, and/or responses between the storage device and host machine. In some cases, the control module 310 may send the queries, requests, and/or responses over the communication interface between the storage device and host machine. In some examples, the control module 310 may configure the queries, requests, and/or responses in accordance with the HID protocol.

In some embodiments, control module 310 may be configured to use the HID protocol to enable the host machine to retrieve status information from the storage device. In one example, control module 310 may be configured to use the HID protocol to retrieve status regarding at least one of a number of read operations, a number of write operations, a number of read and/or write errors, etc.

In some embodiments, control module 310 may be configured to use the HID protocol to update firmware on the storage device using the HID protocol. For example, control module 310 may enable the host machine to use the communication interface to determine a firmware version currently in use by the storage device. Control module 310 may determine whether the firmware version currently in use by the storage device is a latest version. Upon determining the firmware version currently in use by the storage device is a latest version, the control module 310 may bypass updating the firmware of the storage device. On the other hand, upon determining the firmware version currently in use by the storage device is not the latest version, control module 310 may obtain the latest version of the firmware, uninstall the firmware version currently in use by the storage device, and install the latest version of the firmware on the storage device.

In one embodiment, monitor module 305 may be configured to use the HID protocol to monitor one or more temperatures on the storage device. For example, the storage device may include one or more temperature sensors sensing temperature of the storage device. Monitor module 305 may use the HID protocol to enable the host machine to query the storage device for a reading from the one or more temperature sensors. The monitor module 305 may use the HID protocol to enable the storage device to respond to the query and provide temperature readings from the one or more temperature sensors in a response to the host machine.

In some embodiments, the HID protocol may enable configuration module 315 to perform one or more operations. In one embodiment, configuration module 315 may be operable to configure encryption settings on the storage device using the HID protocol. In one example, configuration module 315 may use the HID protocol to enable encryption on a self-encryption drive (SED). In some embodiments, configuration module 315 may use the HID protocol to perform at least one of control one or more fans of the storage device, display text or graphics, or both, on one or more screens of the storage device, or any combination thereof. The one or more screens may include light emitting diode (LED) screens, liquid crystal display (LCD) screens, organic LED (OLED) screens, micro LED screens, etc. For example, configuration module 315 may use HID protocol to generate, communicate, and/or display one or more notifications regarding the storage device on a screen associated with the storage device. In some cases, configuration module 315 may use the HID protocol to lock and/or unlock the storage device. In some examples, locking the storage device may include making a certain storage area of the storage device inaccessible, making encrypted data stored on the storage device inaccessible, or any combination thereof. In some embodiments, unlocking the storage device may include making a certain storage area of the storage device accessible, making encrypted data stored on the storage device accessible (e.g., decrypting the encrypted data and providing the decrypted data to the host machine), or any combination thereof.

In one embodiment, monitor module 305 may be configured to monitor one or more hardware components on the storage device using the HID protocol. For example, monitor module 305 may use the HID protocol to monitor one or more aspects of a hardware controller of the storage device (e.g. hardware controller temperature, operations per second, etc.), monitor one or more aspects of a storage medium (e.g., amount of storage used, amount of available storage remaining, bad sectors, etc.), and so forth.

In some embodiments, configuration module 315 may be configured to use the HID protocol to configure one or more Redundant Array of Independent Disks (RAID) settings on the storage device. For example, configuration module 315 may be configured to use the HID protocol to configure a RAID mode, configure a RAID volume, allocate storage devices to a RAID volume, set a temperature alert threshold, etc.

In some embodiments, control module 310 may be configured to use the HID protocol to detect an error on storage device and to send an error message to the host machine. For example, control module 310 may be configured to use the HID protocol to detect at least one of a read error, seek error, write error, read error rates, seek error rates, or any combination thereof, generate a notification regarding the one or more errors, and send the generated notification to the host machine.

Figure 4:
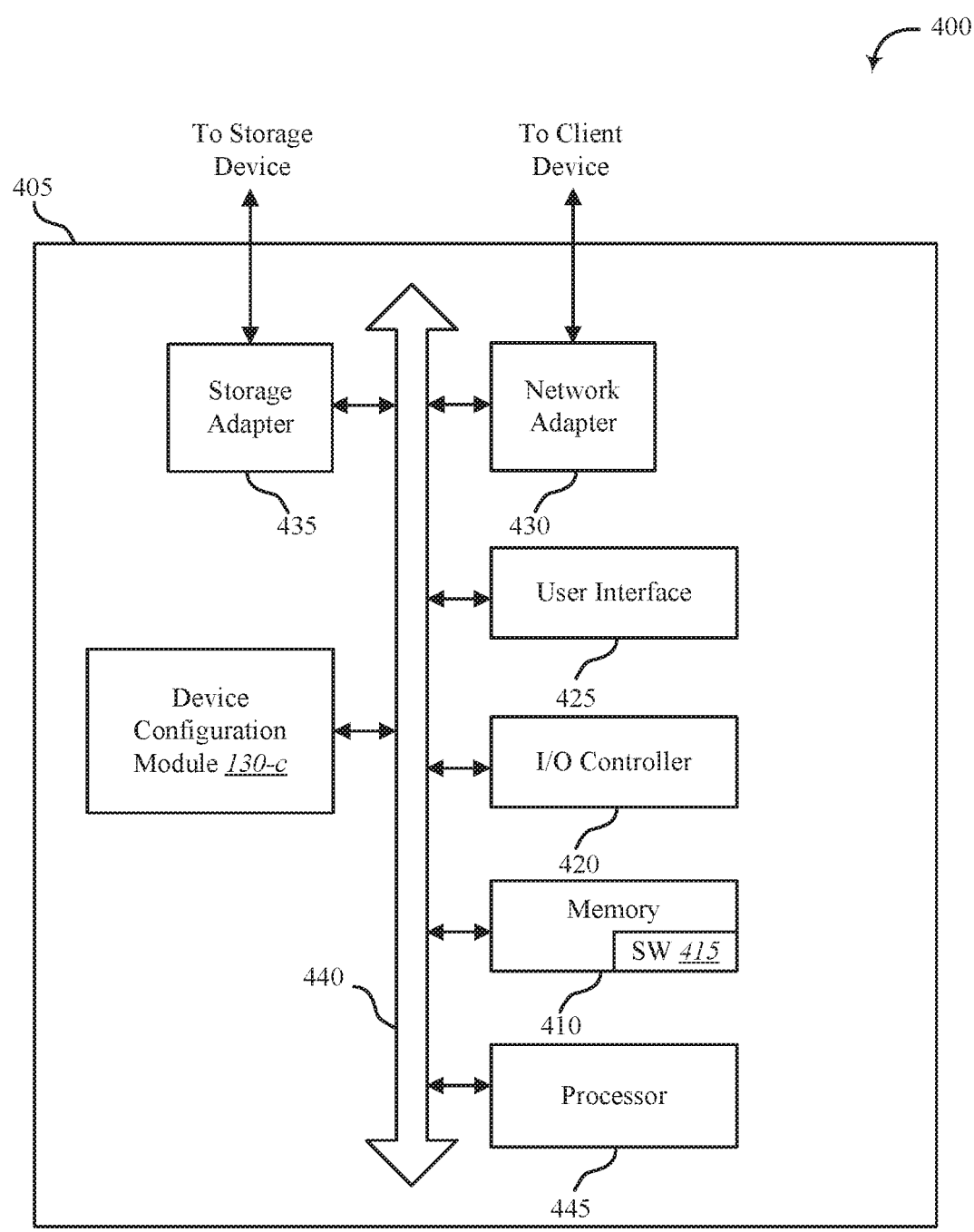
FIG. 4 shows a diagram of a system in accordance with various aspects of this disclosure.

FIG. 4 shows a system 400 for configuration of computer peripherals, in accordance with various examples. System 400 may include an apparatus 405, which may be an example of any one of device 105 of FIG. 1 and/or device 205 of FIG. 2.

Apparatus 405 may include components for bi-directional voice and data communications including components for transmitting communications and components for receiving communications. For example, apparatus 405 may communicate bi-directionally with one or more storage devices and/or client systems. This bi-directional communication may be direct (apparatus 405 communicating directly with a storage system, for example) and/or indirect (apparatus 405 communicating indirectly with a client device through a server, for example).

Apparatus 405 may also include a processor module 445, and memory 410 (including software/firmware code (SW) 415), an input/output controller module 420, a user interface module 425, a network adapter 430, and a storage adapter 435. The software/firmware code 415 may be one example of a software application executing on apparatus 405. The network adapter 430 may communicate bi-directionally, via one or more wired links and/or wireless links, with one or more networks and/or client devices. In some embodiments, network adapter 430 may provide a direct connection to a client device via a direct network link to the Internet via a POP (point of presence). In some embodiments, network adapter 430 of apparatus 405 may provide a connection using wireless techniques, including digital cellular telephone connection, Cellular Digital Packet Data (CDPD) connection, digital satellite data connection, and/or another connection. The apparatus 405 may include device configuration module 130-*c*, which may perform the functions described above for the device configuration module 130 of FIGS. 1, 2, and/or 3.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), or any combination thereof.

One or more buses 440 may allow data communication between one or more elements of apparatus 405 such as processor module 445, memory 410, I/O controller module 420, user interface module 425, network adapter 430, and storage adapter 435, or any combination thereof.

The memory 410 may include random access memory (RAM), read only memory (ROM), flash memory, and/or other types. The memory 410 may store computer-readable, computer-executable software/firmware code 415 including instructions that, when executed, cause the processor module 445 to perform various functions described in this disclosure. Alternatively, the software/firmware code 415 may not be directly executable by the processor module 445 but may cause a computer (when compiled and executed, for example) to perform functions described herein. Alternatively, the computer-readable, computer-executable software/firmware code 415 may not be directly executable by the processor module 445, but may be configured to cause a computer, when compiled and executed, to perform functions described herein. The processor module 445 may include an intelligent hardware device, for example, a central processing unit (CPU), a microcontroller, an application-specific integrated circuit (ASIC), field programmable gate array (FPGA), or any combination thereof.

In some embodiments, the memory 410 may contain, among other things, the Basic Input-Output system (BIOS) which may control basic hardware and/or software operation such as the interaction with peripheral components or devices. For example, at least a portion of the device configuration module 130-*c* to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface such as network adapter 430.

Many other devices and/or subsystems may be connected to and/or included as one or more elements of system 400 (for example, a personal computing device, mobile computing device, smart phone, server, internet-connected device, cell radio module, or any combination thereof). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be a mobile device operation system, a desktop/laptop operating system, or another known operating system.

The I/O controller module 420 may operate in conjunction with network adapter 430 and/or storage adapter 435. The network adapter 430 may enable apparatus 405 with the ability to communicate with client devices such as device 105 of FIG. 1, and/or other devices over a communication network. Network adapter 430 may provide wired and/or wireless network connections. In some cases, network adapter 430 may include an Ethernet adapter or Fibre Channel adapter. Storage adapter 435 may enable apparatus 405 to access one or more data storage devices such as storage device 110. The one or more data storage devices may include two or more data tiers each. The storage adapter 435 may include one or more of an Ethernet adapter, a Fibre Channel adapter, Fibre Channel Protocol (FCP) adapter, a SCSI adapter, and iSCSI protocol adapter.

Figure 5:
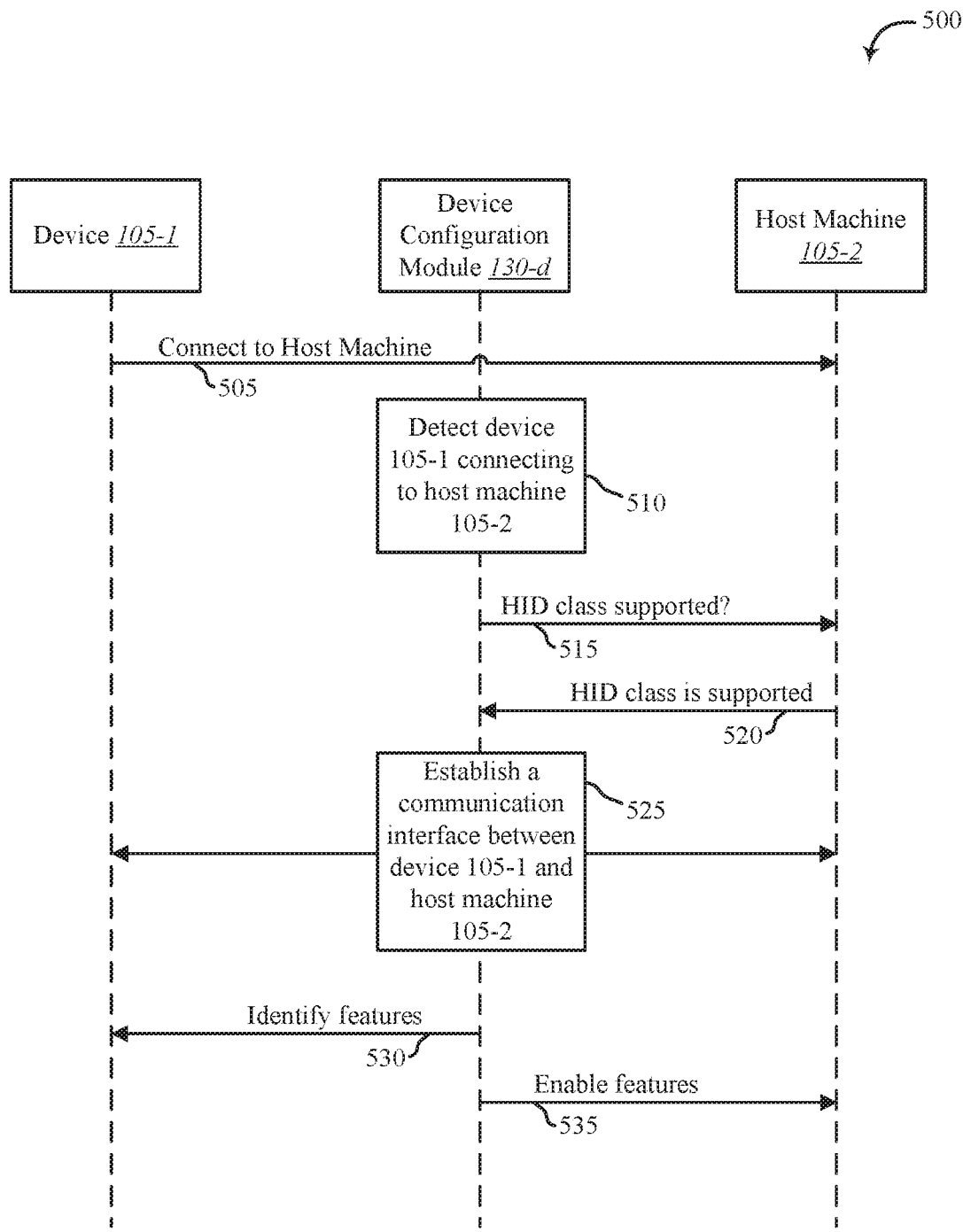
FIG. 5 shows one embodiment of an environment in accordance with various aspects of this disclosure.

FIG. 5 shows an environment 500 for configuration of computer peripherals, in accordance with various examples. At least one aspect of environment 500 may be implemented in conjunction with device 105 of FIG. 1, apparatus 205 of FIG. 2, and/or device configuration module 130 depicted in FIGS. 1, 2, 3, and/or 4.

As depicted, environment 500 may include device 105-1, host machine 105-2, and device configuration module 130-*d*. Device 105-1 and/or host machine 105-2 may be examples of device 105 of FIG. 1, device 205 of FIG. 2, and/or apparatus 405 of FIG. 4. Device configuration module 130-*d* may be an example of device configuration module of FIGS. 1, 2, 3, and/or 4.

As shown at 505, device 105-1 may connect to host machine 105-2. At 510, device configuration module 130-*d* may detect device 105-1 connecting to host machine 105-2. At 515, device configuration module 130-*d* may query host machine 105-2 to determine whether host machine 105-2 supports the HID service. At 520, host machine 105-2 may reply to the query to affirm to device configuration module 130-*d* that the HID service is supported by host machine 105-2.

At 525, device configuration module 130-*d* may establish a communication interface between device 105-1 and host machine 105-2 based at least in part on HID protocols. At 530, device configuration module 130-*d* may identify one or more features of device 105-1. The features may include at least one of configuring one or more settings of device 105-1, updating firmware on device 105-1, monitoring operation conditions of device 105-1, configuring encryption on device 105-1, configuring RAID on device 105-1, or any combination thereof.

At 535, device configuration module 130-*d* may enable the one or more features of device 105-1 on host machine 105-2. In some embodiments, device configuration module 130-*d* may configure the features to be enabled and/or implemented via the communication interface established at 525. For example, host machine 105-2 may use the communication interface to monitor a temperature of device 105-1, host machine 105-2 may query a status of device 105-1 via the communication interface, device 105-1 may reply to a query from host machine 105-2 via the communication interface, host machine 105-2 may modify a configuration of device 105-1 via the communication interface, and so on.

In some embodiments, host machine 105-2 may respond that HID service is not supported. Accordingly, upon determining the host machine does not support the HID service device configuration module 130-d may install a driver on host machine 105-2 to enable the one or more features of device 105-1 on host machine 105-2.

Figure 6:
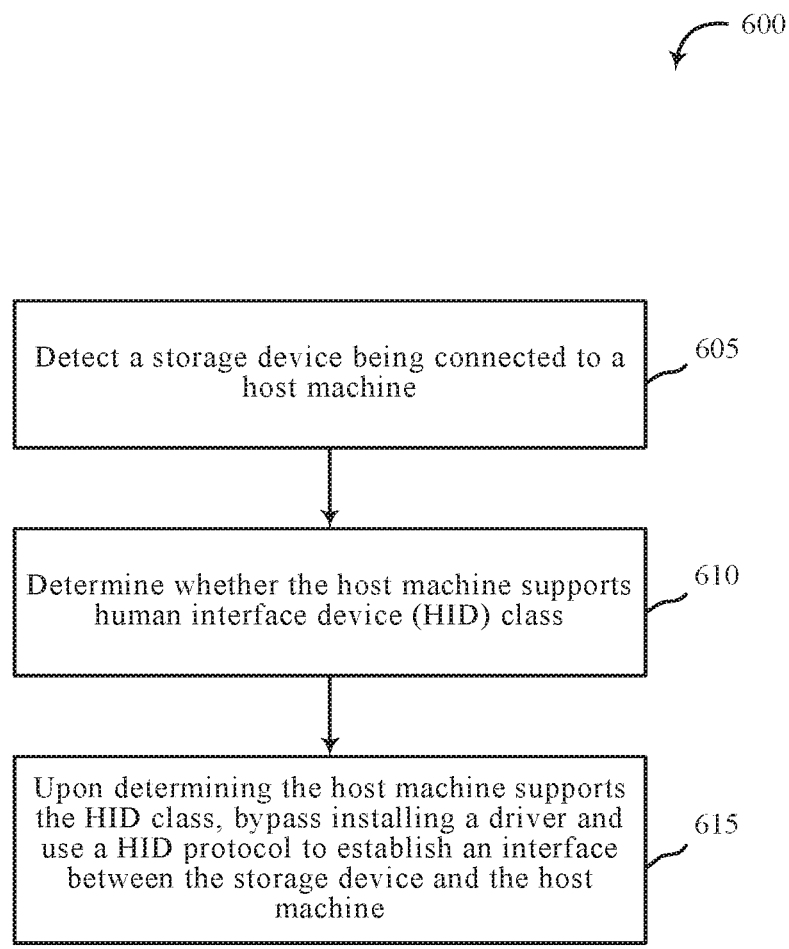
FIG. 6 is a flow chart illustrating an example of a method in accordance with various aspects of this disclosure.

FIG. 6 is a flow chart illustrating an example of a method 600 for configuration of computer peripherals, in accordance with various aspects of the present disclosure. One or more aspects of the method 600 may be implemented in conjunction with device 105 of FIG. 1, apparatus 205 of FIG. 2, and/or device configuration module 130 depicted in FIGS. 1, 2, 3, 4, and/or 5. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 605, method 600 may include detecting a storage device being connected to a host machine. At block 610, method 600 may include determining whether the host machine supports human interface device (HID) service. At block 615, method 600 may include bypassing installation of a driver and using a HID protocol to establish an interface between the storage device and the host machine upon determining the host machine supports the HID service.

The operation(s) at block 605-615 may be performed using the device configuration module 130 described with reference to FIGS. 1-5 and/or another module. Thus, the method 600 may provide for configuration of computer peripherals. It should be noted that the method 600 is just one implementation and that the operations of the method 600 may be rearranged, omitted, and/or otherwise modified such that other implementations are possible and contemplated.

Figure 7:
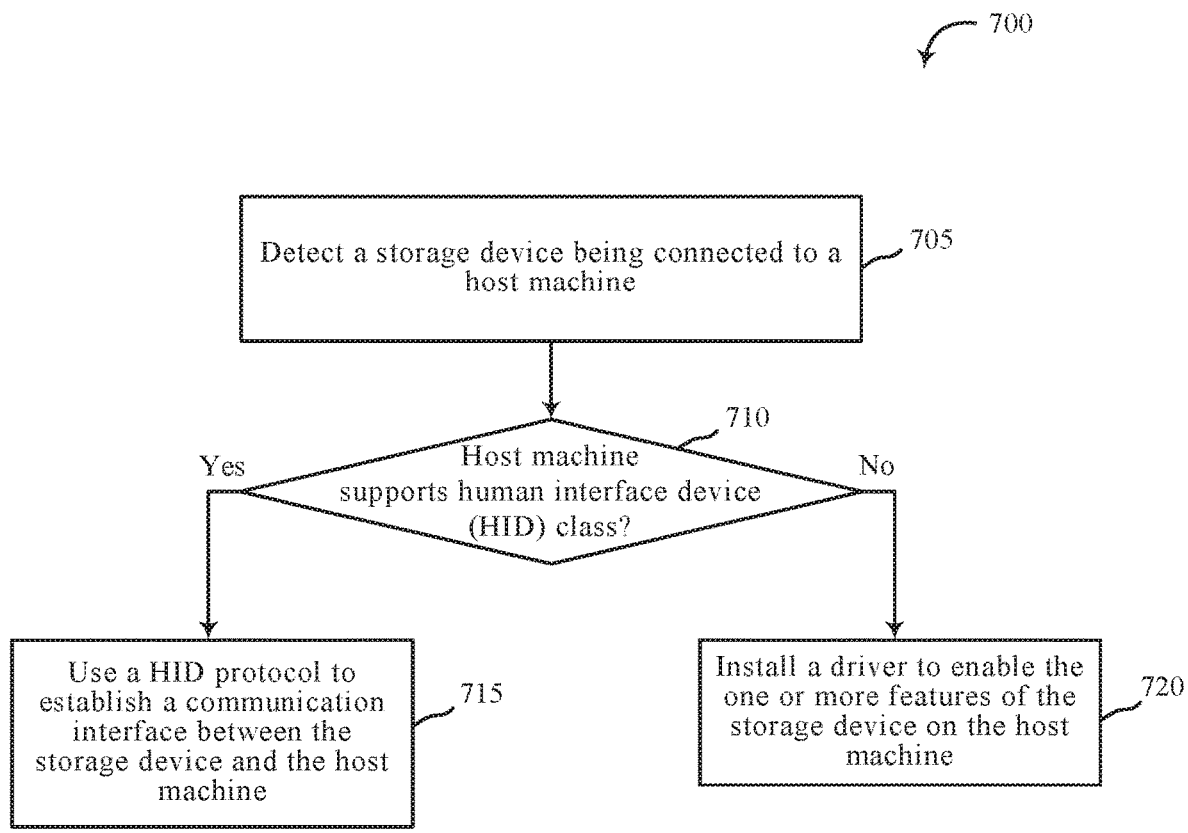
FIG. 7 is a flow chart illustrating an example of a method in accordance with various aspects of this disclosure.

FIG. 7 is a flow chart illustrating an example of a method 700 for configuration of computer peripherals, in accordance with various aspects of the present disclosure. One or more aspects of the method 700 may be implemented in conjunction with device 105 of FIG. 1, apparatus 205 of FIG. 2, and/or device configuration module 130 depicted in FIGS. 1, 2, 3, 4, and/or 5. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 705, method 700 may include detecting a storage device being connected to a host machine. At block 710, method 700 may include determining whether the host machine supports human interface device (HID) service.

At block 715, method 700 may include using a HID protocol to establish a communication interface between the storage device and the host machine upon determining the host machine supports the HID service. In some cases, method 700 may include enabling one or more features of the storage device on the host machine via the communication interface. For example, method 700 may include enabling the host machine to query a status of the storage device via the communication interface, enabling the storage device to reply to a query from the storage device via the communication interface, enabling the host machine to modify a configuration of the storage device via the communication interface, and so on.

At block 720, method 700 may include installing a driver to enable the one or more features of the storage device on the host machine upon determining the host machine does not support the HID service.

The operations at blocks 705-720 may be performed using the device configuration module 130 described with reference to FIGS. 1-5 and/or another module. Thus, the method 700 may provide for configuration of computer peripherals. It should be noted that the method 700 is just one implementation and that the operations of the method 700 may be rearranged, omitted, and/or otherwise modified such that other implementations are possible and contemplated.

In some examples, aspects from two or more of the methods 600 and 700 may be combined and/or separated. It should be noted that the methods 600 and 700 are just example implementations, and that the operations of the methods 600 and 700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, for example, a combination of a DSP and a microprocessor, multiple microprocessors, one or more microprocessors in conjunction with a DSP core, and/or any combination thereof.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC, or A and B and C.

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, or any combination thereof, then the coaxial cable, fiber optic cable, twisted pair, DSL, or wireless technologies such as infrared, radio, and/or microwave are included in the definition of medium. Disk and disc, as used herein, include any combination of compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage system comprising:
   a storage device; and
   a hardware controller configured to:
      detect the storage device being connected to a host machine;
      determine whether the host machine supports human interface device (HID) service;
      upon determining the host machine supports the HID service, bypass installing a driver and use a HID protocol to establish an interface between the storage device and the host machine, thereby enabling the storage device to send data to and receive data from the host machine using the HID service; and
      employ the HID protocol to retrieve identification information of the storage device.

2. The storage system of claim 1, wherein the hardware controller is further configured to:
   update firmware on the storage device using the HID protocol.

3. The storage system of claim 1, wherein the hardware controller is further configured to:
monitor temperature on the storage device using the HID protocol.

4. The storage system of claim 1, wherein the hardware controller is further configured to:
perform at least one of configure encryption settings on the storage device using the HID protocol, control one or more fans of the storage device, display text or graphics, or both, on one or more screens of the storage device, or any combination thereof.

5. The storage system of claim 1, wherein the hardware controller is further configured to:
monitor one or more hardware components on the storage device using the HID protocol.

6. The storage system of claim 1, wherein the hardware controller is further configured to:
use the HID protocol to retrieve at least one of a serial number of the storage device, a firmware version of the storage device, a status report of the storage device, or any combination thereof.

7. The storage system of claim 1, wherein the hardware controller is further configured to:
use the HID protocol to configure one or more Redundant Array of Independent Disks (RAID) settings on the storage device.

8. The storage system of claim 1, wherein the hardware controller is further configured to:
use the HID protocol to detect an error on storage device and to send an error message to the host machine.

9. The storage system of claim 1, wherein the hardware controller is further configured to:
upon determining the host machine does not support the HID service, install a driver to enable one or more features of the storage device on the host machine.

10. The storage system of claim 1, wherein the HID service includes a universal serial bus (USB) HID class; and wherein the storage device is connected to the host machine using at least one of a USB connection, a Thunderbolt connection, a Bluetooth connection, or any combination thereof.

11. A method to improve a storage system comprising:
detecting a storage device being connected to a host machine;
determining whether the host machine supports human interface device (HID) service;
upon determining the host machine supports the HID service, bypassing installation of a driver and using a HID protocol to establish an interface between the storage device and the host machine, thereby enabling the storage device to send data to and receive data from the host machine using the HID service; and
employing the HID protocol to retrieve identification information of the storage device.

12. The method of claim 11, further comprising:
updating firmware on the storage device using the HID protocol.

13. The method of claim 11, further comprising:
monitoring temperature on the storage device using the HID protocol.

14. The method of claim 11, further comprising:
configuring encryption settings on the storage device using the HID protocol.

15. The method of claim 11, further comprising:
monitoring one or more hardware components on the storage device using the HID protocol.

16. The method of claim 11, further comprising:
using the HID protocol to retrieve at least one of a serial number of the storage device, a firmware version of the storage device, a status report of the storage device, or any combination thereof.

17. The method of claim 11, further comprising:
using the HID protocol to configure one or more Redundant Array of Independent Disks (RAID) settings on the storage device.

18. The method of claim 11, further comprising:
using the HID protocol to detect an error on storage device and to send an error message to the host machine.

19. A computer-program product to improve a computer system, the computer-program product comprising a non-transitory computer-readable medium storing instructions thereon, the instructions being executable by one or more processors to perform the steps of:
detecting a storage device being connected to a host machine;
determining whether the host machine supports human interface device (HID) service, wherein the HID service includes a universal serial bus (USB) HID class;
upon determining the host machine supports the HID service, bypassing installation of a driver and using a HID protocol to establish an interface between the storage device and the host machine, thereby enabling the storage device to send data to and receive data from the host machine using the HID service; and
employing the HID protocol to retrieve identification information of the storage device.

20. The computer-program product of claim 19, wherein the instructions executed by the one or more processors cause the one or more processors to perform the steps of:
updating firmware on the storage device using the HID protocol;
monitoring temperature on the storage device using the HID protocol; and
configuring encryption settings on the storage device using the HID protocol.

* * * * *